United States Patent [19]

Askam et al.

[11] Patent Number: 4,504,337
[45] Date of Patent: Mar. 12, 1985

[54] TIRE BUILDING MACHINERY

[75] Inventors: John F. Askam, Sutton Coldfield; William H. Coton, Birmingham, both of England

[73] Assignee: Dunlop Limited, London, England

[21] Appl. No.: 605,411

[22] Filed: Apr. 30, 1984

[30] Foreign Application Priority Data

May 11, 1983 [GB] United Kingdom ............... 8312994

[51] Int. Cl.³ ........................ G01B 5/02; G01B 7/04; B29H 17/16
[52] U.S. Cl. ......................................... 156/64; 83/37; 156/124; 156/133; 156/218; 156/258; 156/272.4; 156/378; 156/405.1; 156/510; 226/49; 226/190
[58] Field of Search ............... 156/124, 126, 133, 134, 156/394.1, 405.1, 417, 64, 159, 199, 215, 218, 258, 264, 272.4, 294, 378, 510, 538; 226/49, 190; 271/275, 276, 277; 83/37; 493/462

[56] References Cited

U.S. PATENT DOCUMENTS

| | | | |
|---|---|---|---|
| 3,674,582 | 7/1972 | Leblond | 156/133 |
| 3,894,906 | 7/1975 | Pearce et al. | 156/126 X |
| 4,090,909 | 5/1978 | Christie et al. | 156/126 X |
| 4,276,104 | 6/1981 | Riggs | 156/133 X |

*Primary Examiner*—William A. Powell
*Assistant Examiner*—Thomas Bokan
*Attorney, Agent, or Firm*—Stevens, Davis, Miller & Mosher

[57] ABSTRACT

Method and apparatus for building annular tire components such as steel cord tread reinforcements, in which a measuring drum is employed to receive strip material and simultaneously to feed it to a component building former. The strip material laps a portion only of the measuring drum, and a measured length of the strip is severed on the measuring drum and the major portion of the length of strip is transferred to the building former by rotation of the measuring drum through substantially a whole revolution.

10 Claims, 13 Drawing Figures

TIRE BUILDING MACHINERY

This invention relates to tire building methods and machinery and particularly to methods and machinery for the manufacture of annular tire components such as steel cord tread reinforcements, also known as "belts" or "breakers" for pneumatic tires.

One problem in the manufacture of pneumatic tires having steel cords in the breaker plies is that it is essential that the ply material is laid in an accurately predetermined location during manufacture: otherwise, undesirable side forces may be set up on the tire when in service, leading to poor steering characteristics and also having an adverse effect on tire tread life.

One object of the present invention is to provide an improved method and apparatus which enables accurately cut steel cord breaker plies to be manufactured for application to a pneumatic tire carcass, with the aim of providing a process which is not only accurately controlled but is also particularly suited for automatic operation.

In accordance with one aspect of the invention, a method for the manufacture of an annular tire component from strip material comprises guiding and feeding the strip material to a measuring drum of predetermined circumference and rotating the measuring drum simultaneously with the feeding of the strip to transfer the material to a component building former, the material being arranged throughout the feeding and transfer of the strip material to lap a portion only of the measuring drum, and severing a measured length of the strip on the measuring drum, the major portion of the length of strip being transferred to the building former by rotation of the measuring drum through substantially a whole revolution.

According to a further aspect of the invention, apparatus for the manufacture of an annular tire component from strip material comprises a measuring drum of predetermined circumference arranged to transfer strip material to a component building former and provided with means for supplying strip material to the measuring drum, said means being arranged to feed material to the measuring drum simultaneously with the transfer of material from the drum to the former so that the material laps a portion only of the measuring drum during the processes of feeding and transfer, cutting means being provided to sever a length of strip on the measuring drum, the predetermined circumference of the measuring drum being such that the major portion of the length of strip is transferred to the building former by rotation of the measuring drum through substantially a whole revolution.

Preferably, the apparatus in accordance with the invention comprises a measuring drum arranged to be movable into a position adjacent a pneumatic tire breaker or belt building former, a portion of the measuring drum being movable in order to bring breaker ply material carried on the measuring drum into contact with the surface of the former or with material already on the former. The movable portion of the measuring drum may comprise a triangular arcuate flap pivoted about an axial line adjacent the circumference of the measuring drum and providing on one edge a diagonal groove across the external surface of the measuring drum which acts as a guide or anvil for a cutting knife to sever a length of strip material carried on the measuring drum from a continuous length supplied to the measuring drum.

Conveniently, a second triangular flap, forming a rectangle when considered together with the first flap in their developed configuration, is also pivoted so as to support and apply to the building former the tail-end of a strip of material during its transfer from the measuring drum to the building former.

In one construction, two measuring drums are provided for building a pneumatic tire belt or breaker from two brekaer plies of oppositely biased steel cords in which the cords of the respective layers cross one another, the two measuring drums being movable, by axial movement of the drums, into and out of central positions adjacent a rotatable breaker building former mounted in a fixed position.

One embodiment of the invention will now be described, by way of example, with reference to the accompanying drawings, in which.

The apparatus illustrated comprises a breaker building former 10 on which a pneumatic tire breaker may be constructed, the breaker consisting of two breaker plies of rubberised steel cord fabric which are laid on the former with the steel cords at a low bias angle, the cords in each ply making an angle of the order of 20° to the circumferential direction of the former and the respective cords in the two plies being of opposite bias so that the cords of one layer cross the cords of the other layer. Each layer of cords is formed from a strip of bias-cut fabric having the ends severed between cords along a diagonal line relative to the strip so that as applied to the former 10 the material takes the form of an elongated parallelogram and in order to produce a uniform layer it is essential that the two ends abut one another accurately along a diagonal line.

Figure 1:
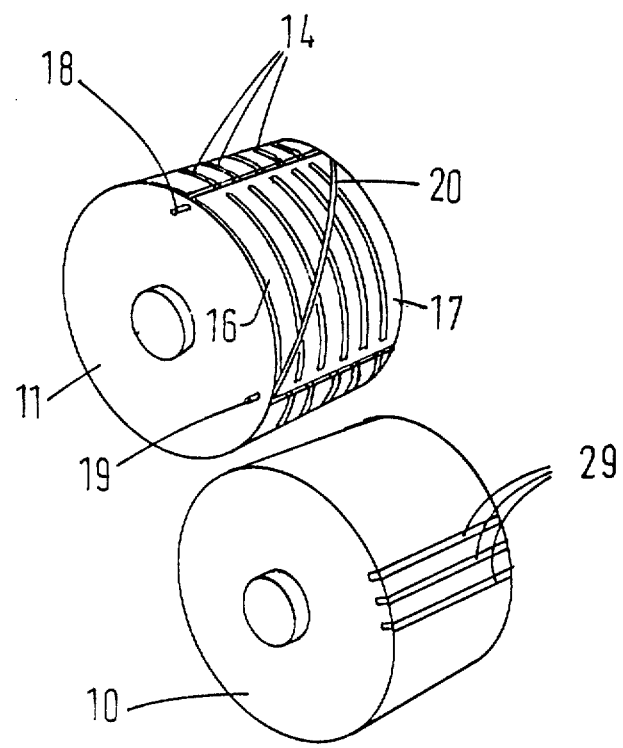
FIG. 1 is a diagrammatic perspective view showing a pneumatic tire breaker building former and associated measuring drum.
Figure 2:
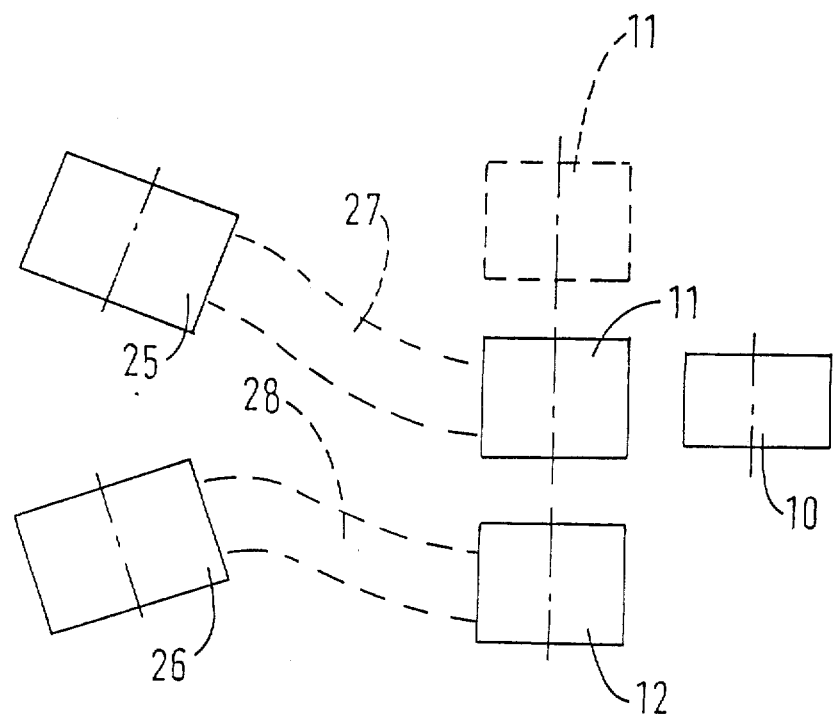
FIG. 2 is a diagrammatic plan view of a breaker building former, two measuring drums and two supply units.
Figure 3:
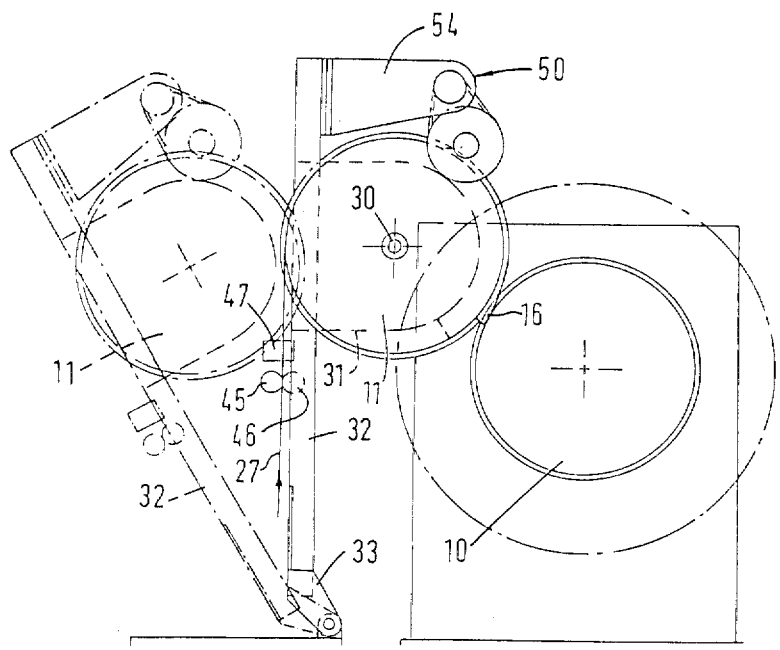
FIG. 3 is a diagrammatic side elevation showing part of a tire breaker building apparatus including a breaker building former and a measuring drum.
Figure 4:
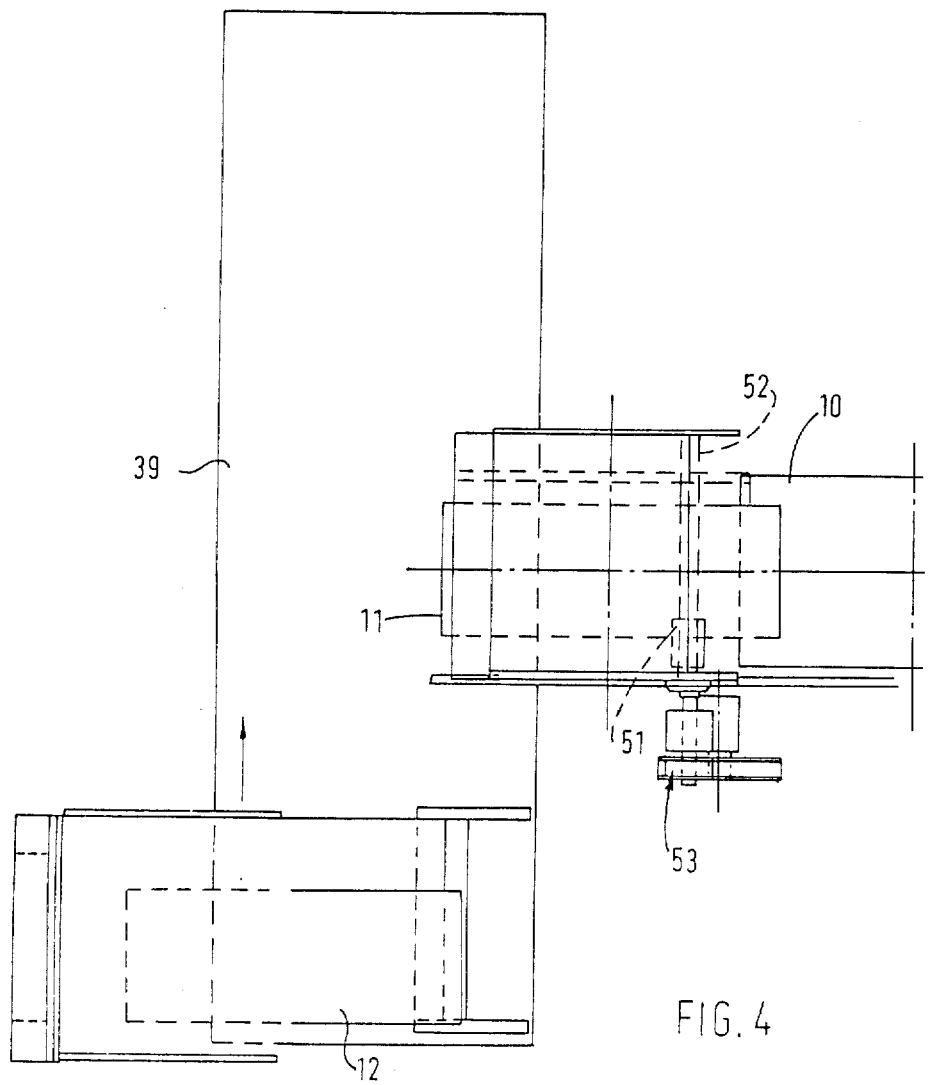
FIG. 4 is a plan view of the apparatus shown in FIG. 2.
Figure 5:
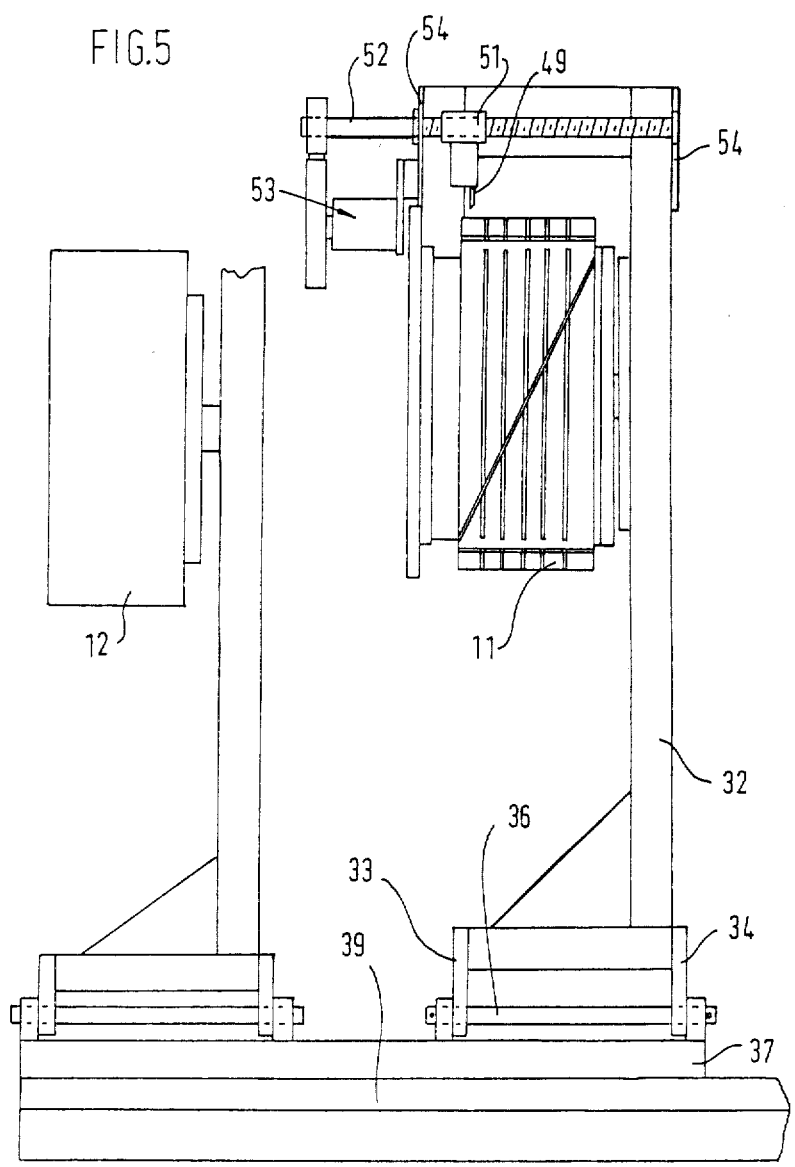
FIG. 5 is an end view of the apparatus shown in FIG 2, as viewed from the right-hand side of FIG. 4.

The arrangement of a breaker building former 10 and a measuring drum 11 as illustrated diagrammatically in FIGS. 1 and 2 and in outline in FIGS. 3–5 is intended to provide a breaker ply of accurately defined length and shape, and to feed it to the breaker building former 10 without distortion so as to achieve a satisfactory joint between the ends of the ply.

The general principles of operation of the measuring drum 11 will be best understood with reference to FIGS. 1 and 2 and the sequence drawings FIGS. 6 to 13. The drum 11 is constructed to be of the exact diameter required to produce a breaker layer of appropriate length, and is provided with annular magnetic pole plates 14 extending to its circumferential surface to hold a strip of steel cord breaker ply material firmly in position thereon. Part of the periphery of the measuring drum 11 is formed by a pair of hinged flaps 16, 17, which are angularly movable about hinge pins 18, 19 respectively. When in the retracted state as shown in FIG. 1 the flaps 16, 17 may be slightly separated along a diagonal line 20 along which a cutter may be traversed to sever a length of ply material for application to the drum 10.

In addition to the drum 11 shown in FIG. 1, a second measuring drum 12 of slightly greater diameter is provided to supply lengths of breaker ply material having the cords disposed at the opposite bias angle to the cords of the first layer. The breaker plies supplied from the drum 12 are thus of slightly greater length to allow for the fact that the second layer of cords has to be super-imposed on the first layer of cords already on the breaker former which thus has effectively a slightly larger diameter.

The measuring drums 11 and 12 are mounted so as to be axially movable into and out of the position occupied in FIG. 2 by the drum 11 (full lines) adjacent the breaker building former 10, the drum 11 being displaceable to the position indicated in dotted lines. Breaker stock spools or cartridges 25, 26 are arranged in fixed positions, the respective lengths 27, 28 of breaker ply material being fed as continuous strips to the drums 11 and 12 and being maintained in their attachment to the drum surfaces in all states of the process. A festoon is formed in each length 27, 28, in accordance with conventional practice, to ensure a free-running continuous supply of material, and to permit the drums 11 and 12 to be reversed through a limited angle as required at one stage of the process to be described.

The breaker building former 10 is a collapsible former of predetermined diameter (equal to the diameter of the measuring drum 11) and is provided with permanent magnets 29 to retain the first layer of breaker ply material on its surface and thus to assist in accurate laying of the ply in position.

FIGS. 3 to 5 show the apparatus in more detail. The measuring drum 11 is carried on an axle 30 mounted in brackets 31 on a support 32 which is itself pivotally mounted by lugs 33, 34 on a pivot pin 36 secured to a slidable base 37, the base 37 being slidable along a track 39 aligned parallel to the axis of the drum 11. The measuring drum 12 is similarly supported so that either one of the drums 11 and 12 can be centrally placed in proximity to the breaker building former 10.

As shown in FIG. 3, the support is shown in full lines in an upright position and in dotted lines in a position where it has been swung away from the building former 10 preparatory to movement of the drum 11 and its support along the track 39. FIG. 5 shows the support 32 in the upright position on the right-hand side of the drawing and the left-hand side of the drawing shows the support in the position corresponding to the dotted-line position of FIG. 3.

Means (not shown) is provided for rotating the measuring drums 11, 12 in synchronisation with rotation of the building former 10.

The support 32 carries a pair of rollers 45 and 46 which are freely rotatably mounted on horizontal axes and are closely adjacent one another so that a strip of material 27 may be guided between the rollers 45, 46 and a second pair of rollers, one of which, 47, can be seen in FIG. 3, is provided to guide the material 27 by engagement with its side edges thus ensuring accurate guidance of the material 27 on to the measuring drum 11.

In order to make the necessary diagonal cuts across breaker material 27 carried on the surface of the drum 11 a cutting mechanism 50 is provided which comprises a heated retractable knife 49 (not shown in detail), mounted on a block 51 which is drivable transversely across the drum 11 along the diagonal junction of the hinged flaps by means of a lead screw 52 which is rotatable by a drive mechanism 53, mounted on brackets 54. The drive mechanism for the lead screw is synchronized with the drive (not shown) for the measuring drum 11 so that when the cutting mechanism is operated the knife 49 descends and travels across the periphery of the drum 11 at a rate such that it follows the path along the junction of the flaps as the drum rotates, and is retracted at the end of each cut.

The operation of the apparatus described above to measure, cut, and transfer a ply of breaker material to the breaker former 10 is as follows:

The material 27 is fed to the drum 11 and initially placed in position by an operator so that its leading end extends over the region of the two triangular flaps 16, 17. The drum 11 is rotated under manual control until the diagonal junction between the flaps is in register with the cutting mechanism 50, following which the drum is rotated and the cutting mechanism operated to sever the material along the diagonal line between the two flaps, and the surplus material is removed. The leading end of the strip of material 27 is now ready for application to the breaker former 10.

Figure 6:
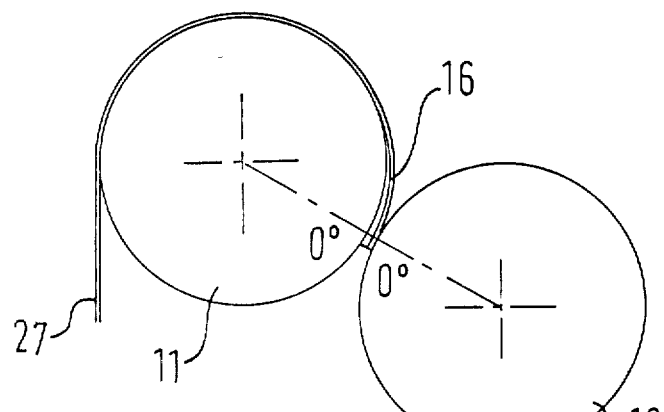
FIGS. 6 to 13 are diagrammatic sequence drawings showing the operation of the apparatus illustrated in FIGS. 3 to 5.
Figure 7:
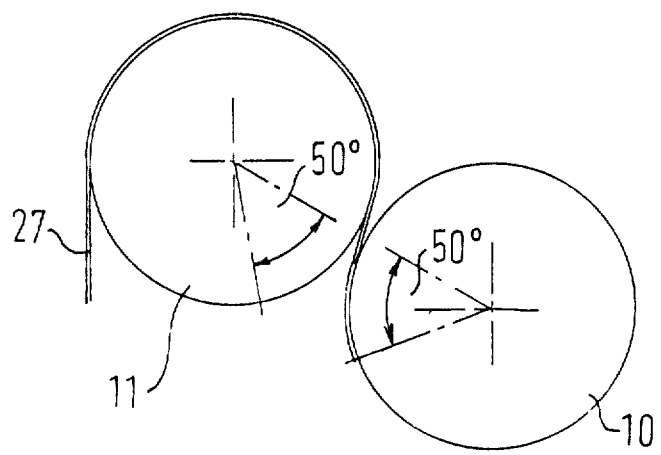
Figure 8:
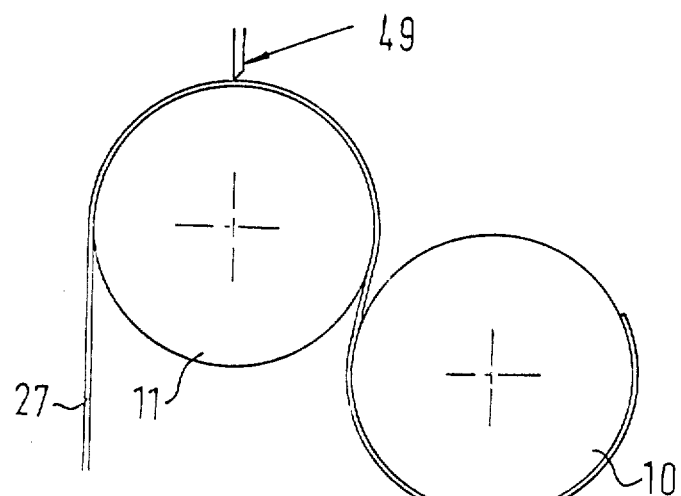
Figure 9:
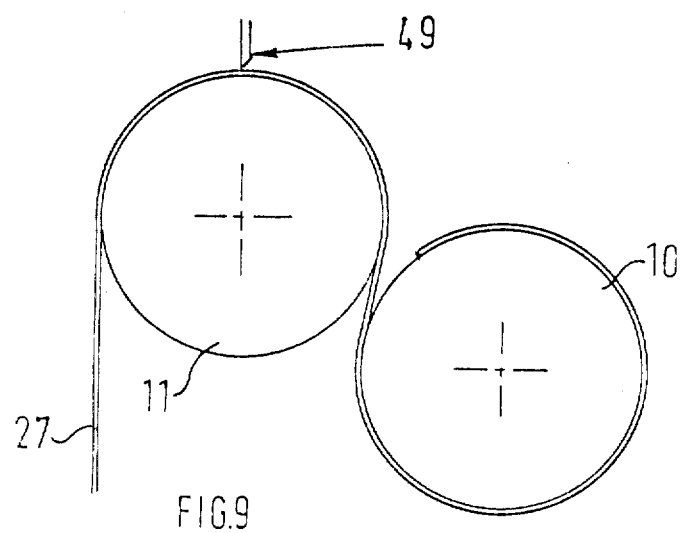

With the breaker former and drum in their relative positions as shown in FIG. 3 and FIG. 6, the automatic sequence of operations to transfer the material to the breaker former commences. The leading end of the flap 16 is moved radially outwards by a suitable automatic mechanism (not shown) so that it carries the pointed leading end of the strip of material 27 into engagement with the surface of the breaker building former 10, where it is held by magnetic means. Separation of the material 27 from the measuring drum 11 is aided by the outward movement of the slotted flap 16 which is of non-magnetic material such as aluminum and lifts the leading end of the material, carried on the pointed end of the flap 16, away from the magnetic pole plates 14 of the measuring former (which extend into slots in the flap 16 when the flap is retracted). As the breaker building former 10 and the measuring drum 11 are rotated in synchronisation, the leading flap 16 is retracted, the retraction being complete after the drum and former have rotated through approximately 50° as seen in FIG. 7, (the angle of rotation is determined by the width and bias angle of the breaker ply–the angle of 50° and other angles given in the following description are merely examples). When the drum and former have rotated through an angle of 240° the cutter is again operated to sever the ply of material which has now been partially transferred to the building former 10. This operation takes place without halting the rotation of the former 10 and building drum 11 and the cutting operation is complete when the former and drum have rotated through an angle of 340°, (see FIG. 9).

Figure 10:
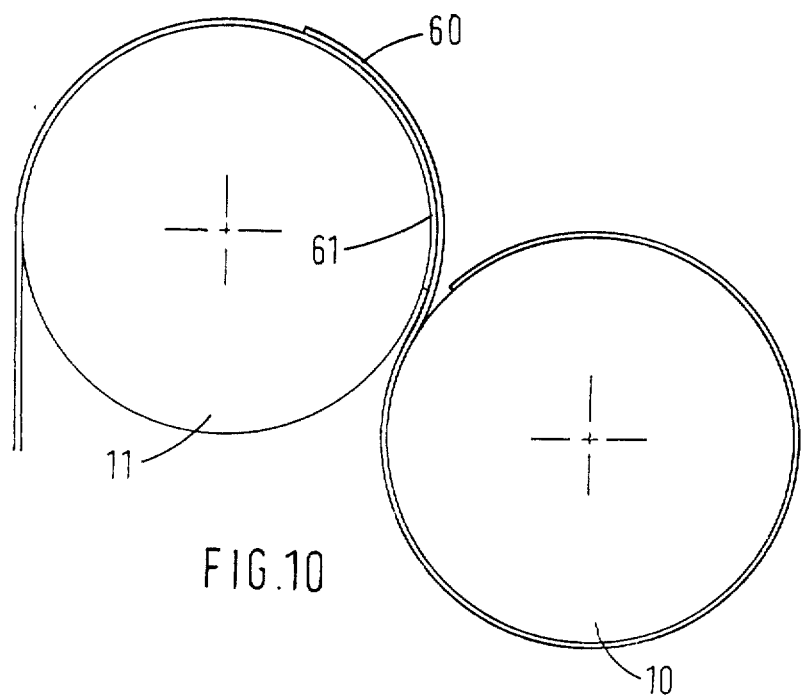
Figure 11:
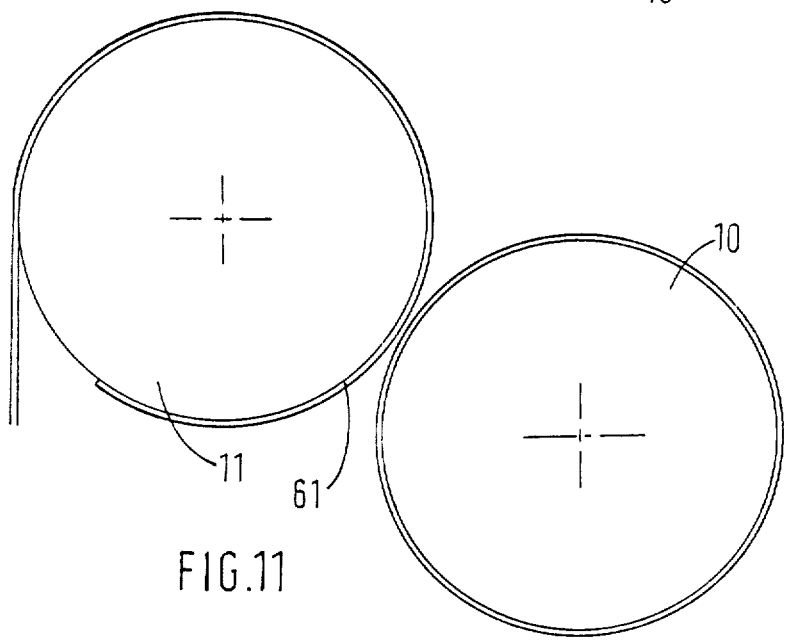
Figure 12:
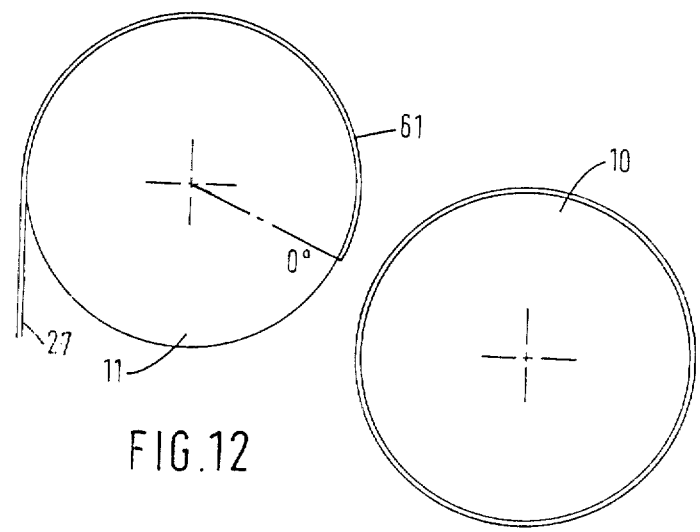

FIG. 10 shows the position when the former 10 and drum 11 have rotated through 360°. At this position, the trailing end 60 of the ply still remains on the measuring drum, supported by the tail flap 17, and the rotation is therefore continued, with the tail flap rising to extend its pointed end outwardly so as to assist in transferring the tail-end of the ply to the former 10. The leading end 61 of the strip 27 remains on the measuring drum 11 during the further rotation to an angle of 460° as shown in FIG. 11, when the transfer is complete and the tail flap is retracted. The drum 11 is then swung out of synchronized contact with the building former 10 and is rotated in a reverse direction to bring the leading end 61 of the material 27 back to the position shown at the beginning of the sequence of operations in FIG. 6.

Figure 13:
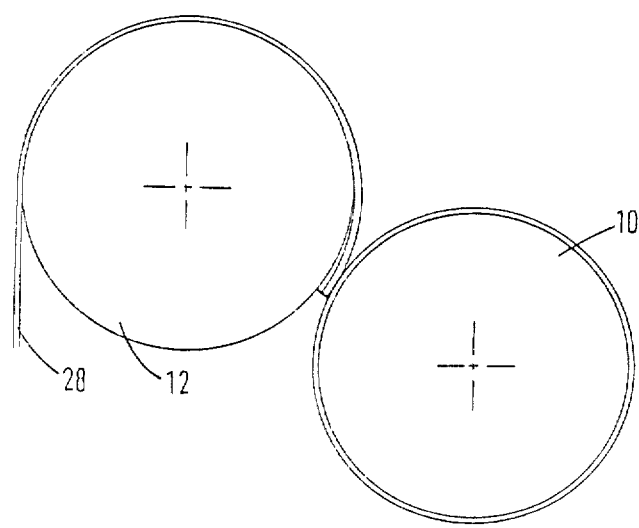

The measuring drum 11 is now moved on its support 32 transversely away from the building former 10, and the measuring drum 12, carrying a strip of material 28 having its cords oppositely biased to those of the strip 27 is moved into place as shown in FIG. 13. The same sequence of operations is then repeated to measure, cut, and transfer a second breaker ply to the breaker building former 10, and at the conclusion of this sequence the completed two-ply breaker is removed from the former 10 by conventional apparatus comprising a breaker transfer ring which is positioned around the breaker former and operated to grip the completed breaker, the former 10 is collapsed and the completed breaker is removed in the axial direction. The breaker may alternatively be covered by additional plies and/or a tread strip fed from conventional apparatus or from additional measuring drums similar to the drums 11 and 12 whilst still on the breaker former, the assembly of breaker and tread then being removed as a unit.

The system in accordance with the invention enables breakers to be cut accurately to length, since the length is dependent solely on the diameter of the measuring drum, and the operation of the hinged flaps 16, 17 ensures that the cut, pointed ends of the breaker plies are not subject to any distortion which may arise in handling by conventional means.

Conventionally cut breaker plies are subject to distortion at their cut ends in a number of respects including curling of the edges and non-linear cut edges resulting from movement of the cords in the ply in handling, and these result in difficulty in obtaining a true register between the two cut ends of the breaker ply when they are wrapped around the building former. These problems are eliminated in the operation of the apparatus in accordance with the invention, rendering it particularly suitable for automatic operation.

Whilst the invention has been described with reference to the application of steel cord breaker plies to a breaker building former, it is also suitable for application to the manufacture of other annular tire components such as fillers.

We claim:

1. A method for the manufacture of an annular tire component from strip material comprising feeding the strip material to a measuring drum of predetermined circumference and rotating said measuring drum simultaneously with the feeding of the strip to transfer the material to a building former, the material being arranged throughout the feeding and transfer of the strip material to lap a portion only of the measuring drum, and severing a measured length of the strip on the measuring drum, the length of strip being transferred to the building former by rotation of the measuring drum through substantially a whole revolution.

2. A method according to claim 1, as applied to the manufacture of a pneumatic tire breaker from breaker ply material, comprising extending a triangular flap from the measuring drum to raise the leading end of the breaker ply and to apply the said leading end to a breaker building former.

3. Apparatus for the manufacture of an annular tire component from strip material comprising a measuring drum of predetermined circumference arranged to transfer strip material to a component building former, means for supplying strip material to the measuring drum simultaneously with the transfer of material from the drum to the former whereby the material laps a portion only of the measuring drum during the processes of feeding and transfer, and cutting means for severing a length of the strip on the measuring drum, said predetermined circumference of the measuring drum being such that the major portion of the length of the strip is transferred to the building former by rotation of the measuring drum through substantially a whole revolution.

4. Apparatus according to claim 3 wherein the measuring drum comprises a movable portion arranged to be moved so as to bring breaker ply material carried on the measuring drum into contact with the surface of a breaker building former or with material already on the former.

5. Apparatus according to claim 4, wherein the movable portion comprises a triangular arcuate flap pivoted about an axial line adjacent the circumference of the measuring drum.

6. Apparatus according to claim 5, wherein the triangular flap provides a diagonal guide for a cutting knife.

7. Apparatus according to claim 5 comprising a second triangular flap forming a rectangle when considered together with the first flap in their developed configuration, the second flap also being pivoted about an axial line adjacent the circumference of the measuring drum whereby one flap is pivotally movable to extend its pointed end outwardly to apply the leading end of a strip of breaker ply material to the breaker building former and the other flap is pivotally movable to extend its pointed end outwardly to assist in transfer of the trailing end of the breaker ply material to the building former.

8. Apparatus according to claim 7, wherein the cutting means comprises a knife supported to be movable across the measuring drum, drive means incorporating a lead screw to drive the knife across the measuring drum, and means for synchronizing the movement of the knife with the drive for the measuring drum to cut a strip of material thereon along a diagonal line between the two flaps.

9. Apparatus according to claim 7 wherein the measuring drum is provided with magnetic means arranged to hold steel cord ply material in engagement with its surface, and wherein the hinged flaps are formed from non-magnetic material.

10. Apparatus for the manufacture of an annular tire component from strip material comprising a component building former, a measuring drum of predetermined circumference arranged to transfer strip material to said component building former and having a movable portion in the form of a triangular arcuate flap pivoted about an axial line adjacent the circumference of the said measuring drum, means for supplying strip material to the measuring drum simultaneously with the transfer of material from the drum to the former whereby the material laps a portion only of the measuring drum during the processes of feeding and transfer, and cutting means for severing the material after the drum has rotated through substantially a whole revolution, means being provided to move said flap to extend its pointed end outwardly from the drum to apply an end of a strip of material to the said former.

* * * * *